Patented Jan. 16, 1934

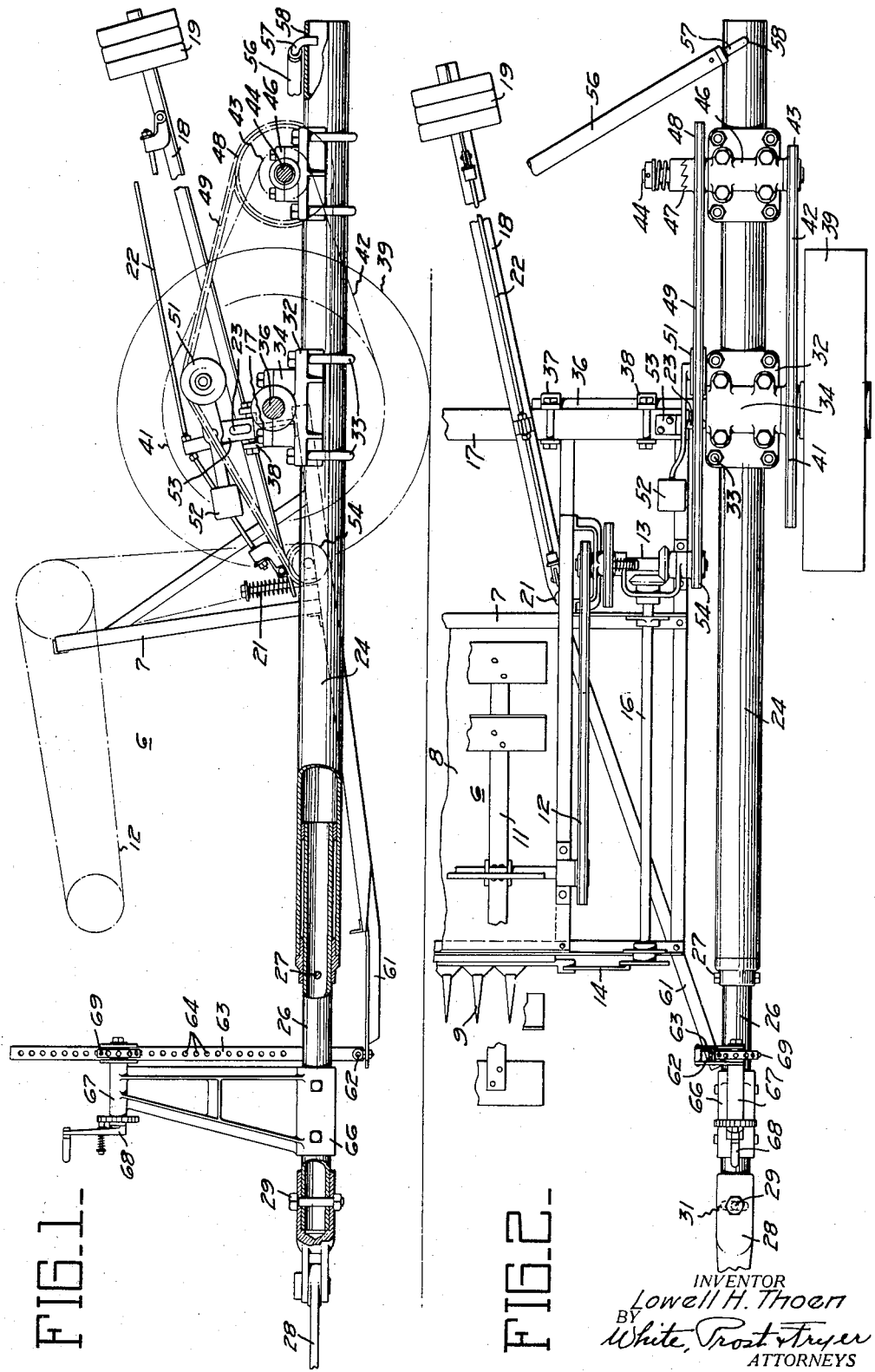

1,943,565

UNITED STATES PATENT OFFICE 1,943,565

WINDROW ADAPTER

Lowell H. Thoen, Stockton, Calif., assignor to Caterpillar Tractor Co., San Leandro, Calif., a corporation of California Application May 28, 1929. Serial No. 366,561

39 Claims. (Cl. 56—23)

My invention relates to means for utilizing the standard header unit of a combined harvester for cutting standing grain and depositing the cut grain directly upon the field in windrows.

It is customary in harvesting grain under certain conditions to cut the standing grain and instead of conveying it directly to a threshing mechanism for separating the grain kernels from the grain straw to deposit the grain directly upon the ground, usually in windrows, for considerable drying and aeration prior to the threshing thereof. Numerous specialized machines have been developed for treating the grain in this fashion and it is to accomplish these results by the use of the standard header unit of a standard combined harvester that I provide the windrow adapter of my invention.

It is an object of my invention to provide means for adapting a standard header unit for use in cutting standing grain and depositing the cut grain on the ground in windrows.

Another object of my invention is to provide a windrow adapter which is relatively rigid although light in weight.

Another object of my invention is to provide a windrow adapter which can easily be shipped.

A further object of my invention is to provide a windrow adapter which will furnish the necessary motive power for operating the standard header unit of a combined harvester.

An additional object of my invention is to provide a windrow adapter which may easily and quickly be attached to and detached from the header unit of a combined harvester.

The foregoing and other objects are attained in the embodiment of the invention shown in the drawing, in which, Figure 1 is a side elevation, portions being in section, of the windrow adapter of my invention.

Figure 2 is a plan of the windrow adapter of my invention attached to a standard header unit.

In its preferred form, the windrow adapter of my invention comprises a pair of telescoping members providing a relatively rigid body which is supported on the ground and which is adapted to receive the header unit of a combined harvester. The adapter is capable of supporting pivotally the header unit and is provided with means for adjusting the relative pivotal movement of the header with respect to the adapter and is further provided with a draft connection.

The device of my invention is adapted for use with a standard header unit of a combined harvester generally designated as 6. The header unit is normally used as a part of a combined harvester, as illustrated in Fig. 2 of the patent to Best No. 1,064,812, where the header unit is designated generally as 10. This header unit usually includes a framework 7 carrying a draper 8 and a sickle 9 at its leading edge. The draper 8 is conveniently provided in much the same manner and relationship as is the draper designated at 9 in Fig. 2 of the Dugan Patent No. 1,350,012. Mounted on the framework is a reel 11 driven by a sprocket chain 12 from a gear nest 13. The sickle bar 9 is also driven from the gear nest through a pitman 14 and a drive shaft 16. The header framework 7 is customarily supported on an axle 17 to which, in this instance, is pivoted a balance beam 18 at its rear extremity carrying a counter weight 19 and at its forward extremity connected through a coil spring 21 with the framework 7. Preferably the balance beam is constructed of a metal shape reinforced by a truss 22. As is the usual practice, the outer end of the axle 17 terminates in an outboard ground engaging and supporting wheel, not shown, while the inner end of the axle carries a hook 23 adapted to be engaged with the framework of the separator unit of a standard combined harvester.

In accordance with my invention I preferably provide an adapter for use in supporting the header unit and making it portable over a field for use in cutting standing grain without the employment of a separate unit. My windrow adapter preferably comprises a member 24 preferably a metal tube of relatively large diameter and of suitable length to be easily shipped. A second member 26 is provided and preferably comprises a metal tube of somewhat smaller diameter telescoped within the forward end of member 24 and held in adjusted telescopic relation by studs 27. The forward end of the tube 26 terminates in a draft connection 28 secured to the tube by a through pin 29 operating in an elongated slot 31 to permit relative axial oscillation of the draft connection with respect to tube 26 to take care of inequalities in the relationship of the draft mechanism and the adapter of my invention.

It will be appreciated that by virtue of the telescopic connection, the tubes 24 and 26 can be extended to any degree desired to effect the most favorable draft conditions and also can be collapsed for convenience in shipping and transportation. Furthermore, the members 24 and 26 form a single beam main supporting frame or carriage; and this coupled with the tubular form of the body composed of members 24 and 26 provides a construction extremely rigid without being unduly heavy. The unbalanced forces imposed upon the body by the header unit are ably withstood so that vibration and weaving of the frame as the device is transported over the ground are minimized.

Secured to the tube 24 is a saddle 32 held in place by U-bolts 33 and carrying a box 34 for receiving a stub axle 36 disposed transversely of the tube. The stub axle is lashed to the axle 17 by clamps 37 and 38 while the outboard portion of the stub axle carries a ground engaging and vehicle supporting wheel 39. This wheel rotates during the advancing movement of the vehicle and turns synchronously a bull sprocket 41 engaging a sprocket chain 42 which also passes around a sprocket 43. This latter sprocket is secured to a shaft 44 journalled in a bearing 46 clamped on the rearward portion of tube 24 and driving, through a one-way clutch 47, a sprocket 48. A chain 49 engages the sprocket 48 and, passing over an idler 51 yieldingly held against the chain by a counterweight 52 and supported on a bracket 53, engages a drive sprocket 54 for the gear nest 13. In this fashion, advancing movement of the header and windrow adapter causes operation of the sickle 9, the reel 11 and the draper 8 in the proper and customary fashion.

To assist the stub axle 36 in transmitting to the body of my windrow adapter, the load of propelling the header, a push pole 56 is connected at its forward end to the outward extremity of axle 17 in the customary fashion, not shown, while the trailing end of the push pole terminates in a hook 57 received in an aperture 58 in the rearward extremity of tube 24. The connection of the push pole 56 with the tube 24 is sufficiently yielding that pivotal movement of the header about the axis of stub shaft 36 may readily be effected.

In order to take advantage of this pivotal relationship and to dispose the header with the sickle 9 at the desired height above the ground, I preferably provide an adjustable connection for disposing the header and the body of my adapter at any desired pivotal angle. The header frame includes an arm 61 which terminates adjacent the tube 26 in an eyelet 62. Pivotally connected to the eyelet is a vertical strap 63 having a plurality of perforations 64 therein. Mounted on the tube 26 is a frame 66 extending a considerable distance above the tube and carrying a bearing 67 for a crank 68 operable by the operator of the draft vehicle, not shown. The rearward end of crank shaft 68 carries a pinion 69 engagable with the various apertures 64 in strap 63 so that by rotating the crank 68 the operator can raise and lower the arm 61 and adjust the relative pivotal relationship of the header unit with respect to the windrow adapter.

It will be appreciated that by virtue of the windrow adapter of my invention, a carriage is provided making the header unit of a standard combined harvester readily portable over a field to cut the standing grain and deposit the cut grain on the ground in windrows. Furthermore, the unbalanced stresses exerted upon the adapter body or frame by the offset header are well taken care of by the relatively rigid but light body construction while the telescoping feature is valuable in reducing the compass of the windrow adapter for shipping and transportation. Furthermore, the header can easily be attached and detached from the adapter so that it can at any time be transferred to a separator unit to form a combined harvester. In addition, the windrow adapter of my invention can very easily be fabricated inasmuch as it is composed of a minimum number of parts requiring practically no fitting and very little labor.

It is to be understood that I do not limit myself to the form of the windrow adapter shown and described herein, as the invention, as set forth in the following claims may be embodied in a plurality of forms.

I claim:

1. A windrow adapter for a header unit comprising a pair of telescoping tubes, a supporting wheel mounted on the first of said tubes, means for fastening said header to said first tube, a draft connection on the second of said tubes, and means for fastening said header to said second tube.

2. A windrow adapter for a header unit comprising a pair of telescoping tubes, means for holding said tubes in a predetermined telescoped relation, means for pivotally connecting said header to the first of said tubes, and means for adjustably connecting said header to the second of said tubes whereby the pivotal relationship of said header and said first tube can be varied.

3. A windrow adapter for a header comprising a pair of members aligned end to end and providing a body, means carried by said body for supporting said body on the ground, a draft connection on said body, means on one of said members for pivotal connection to said header, and means on the other of said members for effecting pivotal movement of said header relative to said body.

4. A windrow adapter for a header comprising an axle, a supporting wheel mounted on said axle, a header secured to said axle, a first tube secured to said axle, a second tube telescoping with said first tube, means for connecting said header to said second tube, and a draft connection on said second tube.

5. A windrow adapter for a header comprising a telescoping tubular body, means for supporting said body for movement over the ground, a draft connection on said body, means for pivotally connecting a header to said body, and means for maintaining said header in a predetermined pivotal relationship with said body.

6. A windrow adapter for a header comprising an extensible body providing a support for said header, means for supporting said body for movement over the ground, a draft connection on said body and means for connecting a header to said body.

7. A header having means for conveying material toward a side of the header, and a carriage therefor having a tubular frame positioned at a side of the header and extending transversely with respect to said conveying means.

8. A carriage for a header having means for conveying material toward a side of the header, comprising a tubular frame positioned at a side of the header and extending transversely with respect to said conveying means, and means for pivotally connecting said header thereto.

9. A carriage for a header having means for conveying material toward a side of the header, comprising a tubular frame positioned at a side of the header and extending transversely with respect to said conveying means, and means to adjustably support said header thereon.

10. A carriage for a header having means for conveying material toward a side of the header, comprising a tubular frame positioned at a side of the header and extending transversely with respect to said conveying means, a wheel and axle support therefor, means to attach said header to said axle, and means to drive said header from said wheel.

11. The combination of a header having a frame and an axle with a carriage comprising a tubular frame, a wheel and axle therefore, a draft connection thereto, means to lash said header axle to said carriage axle, means to adjustably connect said header frame to said carriage frame, and a push bar between said header frame and said carriage frame.

12. In a vehicle, a cylindrical main frame consisting essentially of a single beam.

13. In a vehicle, a cylindrical main frame and draft connection forming essentially a single beam extending in one direction.

14. In a vehicle, a tubular main frame and a telescoping draft connection forming essentially a single beam.

15. In a vehicle, a tubular main frame extending in a single direction, and an auxiliary frame pivoted thereon intermediate the ends of the main frame.

16. In a carriage for a header having means for conveying material to a side of said header, a cylindrical member providing a main frame extending transversely with respect to said conveying means and positioned at a side of said header.

17. In a carriage for a header, a cylindrical member providing a pivotal bearing for the header, and another cylindrical member providing a main frame, the first-mentioned member being mounted on the main frame intermediate the ends thereof with its axis extending transversely to the main frame axis.

18. In a carriage for a header, a cylindrical member providing a draft connection and another cylindrical member providing a main frame, both of said members forming substantially a single beam serving as the entire main frame.

19. In a carriage for a header, a cylindrical member providing a pivotal bearing for the header, a second cylindrical member providing a draft connection and another cylindrical member providing a main frame.

20. In a vehicle, a tubular main frame extending in a single direction, and an auxiliary frame supported thereby intermediate the ends of said main frame.

21. A windrow header having a hollow main frame at a side of the header.

22. A windrow header having a one-piece hollow main frame at a side of the header.

23. A windrow header having a series of connected tubes extending in a single straight line direction, one of which provides a draft connection.

24. A windrow header having a series of connected tubes aligned end to end, one of which provides a pivotal bearing for the header intermediate the ends thereof.

25. A windrow header having a series of connected tubes aligned end to end and extending in a single straight line direction, one of which provides a main frame.

26. In a harvester; a header unit comprising a frame, a ground support therefor, and grain handling mechanism carried thereby, and a main frame supporting said header unit and detachably secured thereto, said main frame consisting essentially of a beam formed of a single piece of material extending forwardly and rearwardly transversely of the header.

27. A windrow machine comprising a header unit, and a main frame detachably secured to and supporting said unit, said main frame consisting essentially of a beam formed of a single piece of material extending forwardly and rearwardly transversely of the header unit.

28. A windrow adapter for a header unit, comprising a carriage in which the main frame consists essentially of a beam formed of a single piece of material and detachably secured to said header unit.

29. A windrow adapter for a header unit of a combined harvester-thresher, comprising a carriage in which the main frame consists essentially of a beam formed of a single piece of material, a ground-engaging wheel supporting the carriage on the ground, and means for driving elements on the header from the ground-engaging wheel.

30. A windrow machine comprising two structurally independent units, one being a header unit having a frame, a ground support therefor and grain handling mechanism carried thereby, and the other unit being a carriage unit for supporting the header unit, the carriage unit comprising a main frame consisting essentially of a beam formed of a single piece of material, and means on the carriage unit and on the header unit to provide a connection between said units.

31. A windrow machine comprising two structurally independent units, one being a header unit having a frame, a ground support therefor and grain handling mechanism carried thereby, and the other unit being a carriage unit for supporting the header unit, the carriage unit comprising a main frame consisting essentially of a tubular body arcuate in section, and means on the carriage unit and on the header unit to provide a connection between said units.

32. A windrow machine comprising two structurally independent units, one a header unit having a frame, a ground support therefor, and a draper carried thereby, and the other unit being a carriage unit for supporting the header unit, the carriage unit comprising a main frame consisting essentially of a beam formed of a single piece of material extending forwardly and rearwardly transversely of the draper, means on the carriage unit and on the header unit providing a connection between said units, a ground-engaging wheel for supporting said carriage unit, and means for driving elements on the header unit from the ground-engaging member.

33. A windrow machine comprising two structurally independent units, one a header unit having a frame, a ground support therefor, and a draper carried thereby, and the other unit being a carriage unit for supporting the header unit, the carriage unit having a tubular main frame arcuate in section and extending forwardly and rearwardly transversely of the draper, means on the carriage unit and on the header unit providing a connection between said units, a ground-engaging wheel for supporting said carriage unit, and means for driving elements on the header unit from the ground-engaging member.

34. A windrow machine comprising a header unit including a frame, a ground support therefor, and grain handling mechanism carried thereby; a main frame for supporting said header unit, consisting essentially of a beam formed of a single piece of material extending transversely with respect to the header unit; means for connecting the header unit to the main frame intermediate the ends thereof and for pivotal movement about an axis extending transversely with respect to the main frame; and a push pole extending from the rear of the header unit to the main frame.

35. A windrow machine comprising a header unit including a frame, a ground-engaging wheel therefor, and grain handling mechanism carried thereby; a main frame for supporting said header unit, consisting essentially of a beam formed of a single piece of material extending transversely with respect to the header unit, and having a ground-engaging wheel journaled for rotation about a transverse axis intermediate the ends of the main frame; and means for connecting the header unit to the main frame for pivotal movement about said axis.

36. A windrow machine comprising a header unit including a frame, a ground-engaging wheel therefor, and grain handling mechanism carried thereby; a main frame for supporting said header unit, consisting essentially of a beam formed of a single piece of material extending transversely with respect to the header unit, and having a ground-engaging wheel journaled for rotation about a transverse axis intermediate the ends of the main frame; means for connecting the header unit to the main frame for pivotal movement about said axis; and means for driving grain handling mechanism on the header from the ground-engaging wheel.

37. A windrow machine comprising a header unit including a frame, a ground-engaging wheel therefor, and grain handling mechanism carried thereby; a main frame for supporting said header unit, consisting essentially of a beam formed of a single piece of material extending transversely with respect to the header unit, and having a ground-engaging wheel journaled for rotation about a transverse axis intermediate the ends of the main frame; means for connecting the header unit to the main frame for pivotal movement about said axis; a push pole extending diagonally from the rear of the header unit to the main frame; and an adjustable connection from the front of the header unit to the main frame.

38. A windrow machine comprising a normally immobile header unit detached from the thresher unit of a combined harvester-thresher, a wheeled carriage unit for rendering said header unit mobile and for adapting said header unit to provide said windrow machine, said carriage unit having a main frame consisting essentially of a tubular beam arcuate in section and extending transversely with respect to said header unit, and means uniting said header unit and said carriage unit.

39. In a harvester; a header unit comprising a frame, a ground support therefor, and grain handling mechanism carried thereby; and a main frame supporting said header unit and detachably secured thereto, said main frame including a main hollow tube formed essentially of a single sheet of material to provide a beam extending transversely of the header.

LOWELL H. THOEN.